(12) United States Patent
Harris et al.

(10) Patent No.: US 11,301,149 B2
(45) Date of Patent: Apr. 12, 2022

(54) EFFICIENT METADATA STORAGE FOR A NON-VOLATILE STORAGE DEVICE

(71) Applicant: Intel Corporation, Santa Clara, CA (US)

(72) Inventors: James Harris, Chandler, AZ (US); Benjamin Walker, Chandler, AZ (US); Tomasz Zawadzki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 16/295,652

(22) Filed: Mar. 7, 2019

(65) Prior Publication Data
US 2019/0205052 A1 Jul. 4, 2019

(51) Int. Cl.
*G06F 3/06* (2006.01)
*G06F 12/10* (2016.01)

(52) U.S. Cl.
CPC .......... *G06F 3/0631* (2013.01); *G06F 3/0604* (2013.01); *G06F 3/0644* (2013.01); *G06F 3/0659* (2013.01); *G06F 3/0679* (2013.01); *G06F 12/10* (2013.01); *G06F 2212/657* (2013.01)

(58) Field of Classification Search
CPC .... G06F 3/0631; G06F 3/0604; G06F 3/0644; G06F 3/0659; G06F 3/0679; G06F 12/10; G06F 2212/657
See application file for complete search history.

(56) References Cited

U.S. PATENT DOCUMENTS

| | | | |
|---|---|---|---|
| 9,519,510 B2* | 12/2016 | Strauss | G06F 9/467 |
| 10,049,042 B2* | 8/2018 | Tsuruya | G06F 12/0246 |
| 2013/0166859 A1* | 6/2013 | Rhoades | H04L 49/901 |
| | | | 711/156 |
| 2016/0274792 A1* | 9/2016 | Ogawa | G06F 3/061 |

OTHER PUBLICATIONS

Dufrasne, Bert et. al.; "IBM DS8880 Thin Provisioning;" Redbooks; Nov. 2018; available at: https://www.redbooks.ibm.com/redpapers/pdfs/redp5343.pdf.*
Porter, Don; "Virtual Memory: Paging;" University of North Carolina at Chapel Hill; Fall 2016; available at: http://www.cs.unc.edu/~porter/courses/comp530/f16/slides/paging.pdf.*

(Continued)

*Primary Examiner* — Prasith Thammavong
*Assistant Examiner* — Richard L Sutton
(74) *Attorney, Agent, or Firm* — Haley Guiliano LLP (57) ABSTRACT

Embodiments of the present disclosure relate to an electronic apparatus that includes a metadata generator, to generate an extents table (ET) that lists one or more extents pages (EPs), where an EP is a fixed size, and where the one or more EPs store one or more extents. An extent includes an allocation indication for a cluster in a memory device, where a number of the extents corresponds to a number of clusters of the memory device, where a subset number of the extents is stored in one of the one or more EPs, and where the subset number is based on the fixed size of the EP. The electronic apparatus further includes a metadata updater, to modify the allocation indication in the extent stored in the one of the one or more EPs, based on a corresponding change in an allocation of the cluster in the memory device.

14 Claims, 8 Drawing Sheets

(56) References Cited

OTHER PUBLICATIONS

University of Texas; "Virtual Memory and Address Translation;" Nov. 2016; available at: http://www.cs.utexas.edu/users/witchel/372/lectures/15.VirtualMemory.pdf; Wayback Machine: https://web.archive.org/web/20161101000007*/http://www.cs.utexas.edu/users/witchel/372/lectures/15.VirtualMemory.pdf.*

Porter, Don; "Virtual Memory: Paging;" University of North Carolina at Chapel Hill; Fall 2016: available at: http://www.cs.unc.edu/~porter/courses/comp530/f16/slides/paging.pdf (Year: 2016).*

Dufrasne, Bert et. al.; "IBM DS8880 Thin Provisioning;" Redbooks; Nov. 2018; available at: http://www.redbooks.ibm.com/redpapers/pdfs/redp5343.pdf (Year: 2018).*

* cited by examiner

Generating an ET that lists one or more EPs, where an EP is a fixed size, where the one or more EPs store one or more extents, where an extent of the one or more extents includes an allocation indication for a cluster in a memory device, where a number of the one or more extents corresponds to a number of clusters of the memory device, where a subset number of the one or more extents is stored in one of the one or more EPs, and where the subset number of the one or more extents stored in the one of the one or more EPs is based on the fixed size of the EP
410

Modifying the allocation indication in the extent stored in the one of the one or more EPs, based on a corresponding change in an allocation of the cluster in the memory device
420

EFFICIENT METADATA STORAGE FOR A NON-VOLATILE STORAGE DEVICE

FIELD

Embodiments of the present disclosure relate to integrated circuits (IC), and in particular to metadata storage for non-volatile memory (NVM) storage devices.

BACKGROUND

Physical storage devices are often partitioned into many logical storage volumes to enable sharing of physical resources. Information about how a logical storage volume is mapped to a physical storage device is called metadata. One of the properties described by metadata is a mapping of a logical block address (LBA) to a physical block address on the physical storage device. The mapping between the logical blocks and the physical blocks can change over time.

One challenge when designing a metadata scheme is handling the case where the mapping between logical blocks and physical blocks has changed over time. In that case, an update of the logical block might require multiple writes of the metadata, thereby increasing the amount of time for a write to the physical storage device and significantly impacting the performance of a system that contains the physical storage device.

BRIEF DESCRIPTION OF THE DRAWINGS

Embodiments will be readily understood by the following detailed description in conjunction with the accompanying drawings. To facilitate this description, like reference numerals designate like structural elements. Further, the same reference numerals may be used in different drawings to identify the same or similar elements. Embodiments are illustrated by way of example and not by way of limitation in the figures of the accompanying drawings.

DETAILED DESCRIPTION

Embodiments of the present disclosure relate to an electronic apparatus that includes a metadata generator, to generate an extents table (ET) that lists one or more extents pages (EPs), where an EP is a fixed size, where the one or more EPs store one or more extents, where an extent of the one or more extents includes an allocation indication for a cluster in a memory device associated with the electronic apparatus, where a number of the one or more extents corresponds to a number of clusters of the memory device, where a subset number of the one or more extents is stored in one of the one or more EPs, and where the subset number of the one or more extents stored in the one of the one or more EPs is based on the fixed size of the EP. The electronic apparatus further includes a metadata updater coupled with the metadata generator, to modify the allocation indication in the extent stored in the one of the one or more EPs, based on a corresponding change in an allocation of the cluster in the memory device.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" or "A and/or B" means (A), (B), (A) or (B), or (A and B). For the purposes of the present disclosure, the phrase "A, B, or C" or "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. Further, various operations may be described as multiple discrete operations, in turn, in a manner that is most helpful in understanding the illustrative embodiments; however, the order of description should not be construed as to imply that these operations are necessarily order dependent. In particular, these operations are not required to be performed in the order of presentation.

The description may use the phrases "in various embodiments," "in some embodiments," "in an embodiment," "in embodiments," and the like, which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

The term "based on," and the like, along with its derivatives, may be used herein. "Based on" may mean that one element is based entirely on another element, or "based on" may mean that one element is based at least in part on another element and thus may be based at least in part on other elements.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "chip" may refer to a physical IC on a computer. A chip in the context of this document may thus refer to an execution unit that can be single-core or multi-core technology.

As used herein, including in the claims, the term "processor" may refer to a logical execution unit on a physical chip. A multi-core chip may have several cores. As used herein the term "core" may refer to a logical execution unit containing an L1 (lowest level) cache and functional units. Cores are understood as being able to independently execute programs or threads.

Physical storage devices may be partitioned into many logical storage volumes to enable sharing of physical resources. A physical storage device, which may also be referred to as a storage device or a physical device, may be, for example, but is not limited to, NVM, which may also be referred to as non-volatile storage media. Properties of NVM include, but are not limited to, the ability to retain data when electrical power is removed, such as, for example, upon normal shutdown, an unexpected electrical power loss, or an unexpected shut down of a computing device that includes the NVM. NVM may be, for example, but is not limited to, flash memory; a solid state device (SSD); a dual in-line memory module (DIMM); erasable read-only memory (ROM), such as, for example, but not limited to, erasable programmable ROM (EPROM); ferroelectric random-access memory (FRAM); magnetoresistive RAM (MRAM); other types of electrically addressed NVM; or mechanically addressed NVM. Further, NVM may include, but is not limited to, NVM that complies with the NVM Express (NVMe) transfer protocol, such as, for example, but not limited to, an NVMe SSD. Embodiments herein may include aspects to allocate NVM as blocks and thus may be applicable to any block-based storage. Block-based storage may include, but is not limited to, SSDs, such as for example, but not limited to, an NVMe SSD, a Serial AT Attachment (SATA) SSD, or a Serial Attached Small Computer System Interface (SCSI) (SAS) SSD. However, embodiments herein are not limited to block-based storage, SSDs, NVMe SSDs, SATA SSDs, or SAS SSDs.

A logical storage volume, which may also be referred to as a logical volume, may define the size, among other things, of virtual address space for a physical storage device. For example, a 2 terabyte (TB) SSD may have, for example, a 10 gigabyte (GB) logical volume, along with other logical volumes. When the total space reported as available by logical volumes exceeds the total physical storage capacity of a physical storage device, the logical volumes may be called thin-provisioned or thinly provisioned.

Information about how a logical volume is mapped to a physical storage device is called metadata. Logical volumes, including thin-provisioned logical volumes, may store metadata onto the physical storage device itself. Storage of the metadata on a physical storage device may be persistent and power-fail safe, which means no data is lost in the event of an electrical power loss.

Further, metadata stored on a physical storage device may be atomically updated, which means that when it is updated, either all of a specified amount of the data is updated or none of the data is updated. A physical storage device that atomically updates data is said to have write atomicity or guaranteed atomicity. Accordingly, write atomicity or guaranteed atomicity ensures that in the event of, for example, a power loss, data will not be merely partially updated—either all of the specified amount of data that was to be updated prior to the power loss is not updated and still exists after the power loss, or all of the specified amount of data that was to be updated prior to the power loss is updated and now exists as updated after the power loss. Therefore, it will not be the case that some of the data was updated, while the rest of the data has not been updated, which would make accurate data recovery more difficult after a power loss. An NVM, such as, for example, but not limited to, an NVMe device or an NVMe SSD, that has write atomicity or guaranteed atomicity has an atomic write size that indicates a specified amount of data, either all of which will be written or not written, but not partially written, during a write operation for the NVM.

One of the properties described by metadata is a mapping of an LBA to a physical block address on a physical storage device. For example, the LBAs of a logical volume are mapped to physical block addresses on the physical storage device. A cluster on the physical storage device has a defined size, includes a number of physical block addresses that correspond to a contiguous range of physical storage blocks (which may also be referred to as physical blocks), and is mapped to a range of LBAs of a logical volume. For example, a 10 GB logical volume may include a number of clusters, and if each cluster has a size of 1 megabyte (MB), then the 10 GB logical volume would include 10,000 clusters, and the 10,000 clusters would be mapped to 10,000 ranges of LBAs of the logical volume.

A mapping may change over time, if, for example, a logical volume is created, destroyed, or resized, or a thinly provisioned logical volume allocates new physical blocks in response to a write. Because a mapping could change, one challenge when designing a metadata scheme is handling the case where the mapping between logical blocks and physical storage blocks has changed substantially. This may occur when, for example, physical storage blocks become fragmented. Fragmentation may occur on a physical storage device when data is not written close enough to other data on the physical storage device. For example, a file stored on a physical storage device in a computing device may have portions of the file written to one area of the storage device and other portions of the file written to other areas of the storage device. Fragmentation may occur when most of the memory is allocated in a large number of non-contiguous blocks, or chunks, which may leave a large percentage of the total memory unallocated but unusable because, for example, the unallocated portions may not be of suitable size for most uses.

When the file is opened, the storage device pulls together the file's data from the various areas of the storage device, so that the file can be used by the rest of the computing device, such as, for example, for viewing, transmitting, processing, editing, etc. With fragmentation, writes to the physical storage device may take longer because the storage device has to do more work to find a suitable space for new or updated data. As a result, an update to a block of data on a physical storage device may also require multiple writes to update metadata for thin-provisioned logical volumes that store metadata on the storage device, as information about how a logical storage volume is mapped to a physical storage device changes. This situation may significantly impact the performance of a computing device that includes a physical storage device that has thin-provisioned logical volumes. For example, given that a physical storage device is written to in units of blocks, even small metadata updates require writing at least one block. Therefore, if, for example, the physical block size, is 4 KiB, and one block of data is updated on the physical storage device and, for example, three metadata updates, each of which are also 4 KiB writes based on the physical block size, are made to accommodate the 4 KiB data update, then a total of 16 KiB are written for a 4 KiB update of data on the physical storage device. Embodiments herein may include aspects to provide efficient metadata storage to address these and other challenges.

A conventional metadata structure may be run-length encoded, in order to minimize the overall size of the metadata, where mappings point to a starting LBA and describe the length, given in blocks, of corresponding physical blocks. For example, a mapping may include an LBA pointer and a length of two to identify the corresponding physical blocks. Similarly, a mapping may point to a starting LBA and indicate a length of 1024 to identify the corresponding physical blocks.

With run-length encoded metadata structures, changes to the mapping may result in changes to the size of the metadata. As a result, the entire metadata must be rewritten from back to front for each change. When multiple blocks of writes are required for each change to the mapping, performance may be reduced for writes to logical blocks of storage volumes.

Figure 1:
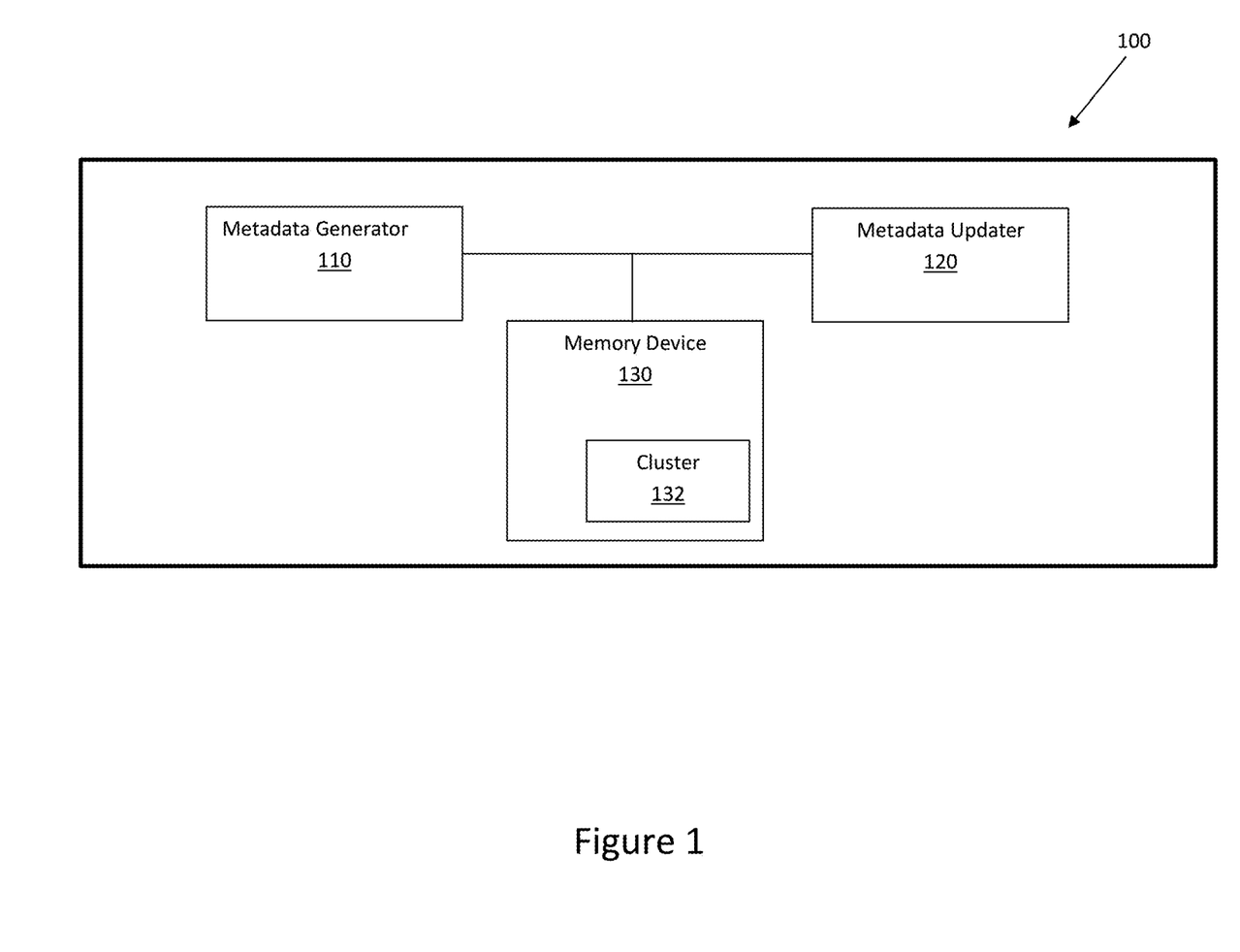
FIG. 1 illustrates a functional block diagram of an example computing device that includes a metadata generator, a metadata updater, and a memory device, in accordance with various embodiments.

FIG. 1 illustrates an example computing device 100 that includes a metadata generator, a metadata updater, and a memory device, in accordance with various embodiments. Computing device 100 includes metadata generator 110, to generate an ET (not shown) that lists one or more EPs (not shown), where an EP is a fixed size, and where the one or more EPs store one or more extents.

An ET indicates a mapping of one or more extents to one or more clusters, e.g., one or more clusters 132, of a memory device, e.g., memory device 130, by listing on one or more EPs that store the one or more extents that are mapped to one or more corresponding clusters. ETs, EPs, and extents are metadata because they describe the structure of actual data placed on a memory device, such as, for example, memory device 130. In an embodiment, a fixed size of an EP is based on an atomic write size of memory device 130. In an embodiment, an ET is also a fixed size, which is the same fixed size as the fixed size of the EP, and the fixed size of an ET is based on an atomic write size of memory device 130. In another embodiment, one or both of an EP or an ET is not a fixed size. For purposes of illustration and ease of explanation, embodiments herein may describe one or more ETs that list one or more EPs. However, embodiments herein are not limited to one or more ETs that list one or more EPs and may include, for example, one or more ETs that include, rather than merely list, one or more EPs, or embodiments herein may include one or more ETs that both list and include the one or more EPs. ETs and EPs are described in further detail below.

An extent indicates where to find a cluster on a memory device, such as, for example, memory device 130, and an extent corresponds to a range of LBAs and is referred to by an index of a starting LBA of the range. For example, if a cluster is 1 MB in size and a physical storage device has 4 KB logical blocks, then an extent refers to a range of 256 LBAs (1 MB divided by 4 KB) and is referred to by an index of the first LBA of the 256 LBAs. In addition, an extent includes an allocation indication for a cluster 132 in memory device 130, where a number of the one or more extents corresponds to a number of clusters of memory device 130, and where a subset number of the one or more extents is stored in one of the one or more EPs, and where the subset number of the extents stored in the EP is based on the fixed size of the EP. In an embodiment, the subset number of extents stored in the EP is a maximum number of extents that can be stored in the EP. Allocation indications are described in more detail below.

In an embodiment, the number of clusters of the memory device is based on a size of a logical volume and a size of a cluster. For example, if a size of a logical volume is X units—a unit as used herein may be expressed in terms of a bytes, kilobyte (KB), kibibyte (KiB), MB, GB, or any other unit that may be used to indicate the size of electronic data or of an amount of electronic data or the size of a file—and the size of a cluster is 1 cluster per Y units, then the number of clusters is given by X divided by Y (X/Y). Further, in an embodiment, the subset number of the one or more extents stored in the EP may be based on the fixed size of the EP and a size of an extent. For example, if an EP has a fixed size of A units per EP, based on the size of an atomic write size of a memory device, and a size of an extent is 1 extent per B units, then the number of extents per EP is given by A divided by B (A/B).

In an embodiment, memory device 130 is an NVM described above, although embodiments herein are not limited to memory device 130 being an NVM described above. For example, in an embodiment, memory device 130 is an NVMe SSD or other type of SSD, while in another embodiment, memory device 130 is another NVM described above. In an embodiment, memory device 130 is an SSD that includes one of more thin-provisioned logical volumes. In another embodiment, memory device 130 is an SSD that includes a logical volume that is not a thin-provisioned logical volume. In an embodiment, one or more ETs and one or more EPs are stored on memory device 130.

In an embodiment, metadata generator 110 writes the ETs and EPs to memory device 130, to store the ETs and EPs on memory device 130. In another embodiment, one or more ETs and one or more EPs are stored in another location on memory device 130. In yet another embodiment, one or more ETs and one or more EPs are stored in a location that is not on memory device 130. Cluster 132 is a physical space or location on memory device 130 where data may be read or written.

Computing device 100 further includes metadata updater 120, coupled with metadata generator 110, to modify the allocation indication in an extent stored in an EP, based on a corresponding change in an allocation of the cluster in the memory device 130. In an embodiment, one or both of metadata generator 110 and metadata updater 120 are implemented as software, for example, as a driver, such as, for example, but not limited to, a memory storage driver, or as an application, which may also be referred to as a userspace application. As such, implementation may be either in a kernel or in userspace. In addition, when implemented as software, metadata generator 110 and metadata updater 120 may run on any type of processor, such as, for example, but not limited to, a field programmable gate array (FPGA). In another embodiment, one or both of metadata generator 110 and metadata updater 120 are implemented as hardware. In yet another embodiment, one or both of metadata generator 110 and metadata updater 120 are implemented as firmware, such as, for example, but not limited to, embedded firmware in an SSD or in an FPGA.

For example, when a logical volume, such as, for example, a thin-provisioned logical volume, is created, metadata generator 110 may map one or more extents to one or more clusters 132 in the logical volume. For example, if the size of a logical volume is 10 GB and the size of a cluster is 1 MB, the number of clusters would be 10,000, and thus there would be 10,000 extents. Further, a subset number of the extents would be included in an EP, and the EP would be listed or included on an ET. For example, if the size of an EP is 4 KB, which is 4000 bytes, and the size of an extent is 8 bytes, the maximum number of extents per EP would be 500, and given that there would be a total of 10,000 extents, those extents would be stored in 20 EPs. Although this example includes a number of EPs that each include the maximum number of extents, an EP may include fewer than the maximum number of extents that may be stored in an EP.

Although an extent may be mapped to a cluster, the cluster may or may not be allocated to its corresponding extent. Consequently, when a write to an LBA of a logical volume occurs, a processor, for example, in computing device 100 determines whether cluster 132 has been allocated to that LBA. As explained in more detail below, metadata updater 120 uses the ET to locate the EP that includes the extent that corresponds to the LBA of the write. If the extent is set to unallocated, which indicates that cluster 132, which is mapped to the extent, is not allocated to the LBA and thus that no physical space on memory device 130 has been reserved for the write operation, the processor allocates cluster 132 to the LBA, so that the write to the logical volume can be performed. In that case, metadata updater 120 modifies the extent to indicate that cluster 132 has been allocated, by including in the extent the LBA of cluster 132. In an embodiment, metadata updater 120 writes the EP that includes the updated extent to memory device 130, based on the fixed size of the EP, which is based on the atomic write size of memory device 130. As a result, instead of re-writing all of the EPs for the logical volume because of one cluster, e.g., cluster 132, becoming allocated, as with conventional metadata structures, metadata updater 120 modifies only the extent that is mapped to cluster 132 and re-writes only the EP that includes the modified extent.

Figure 2:
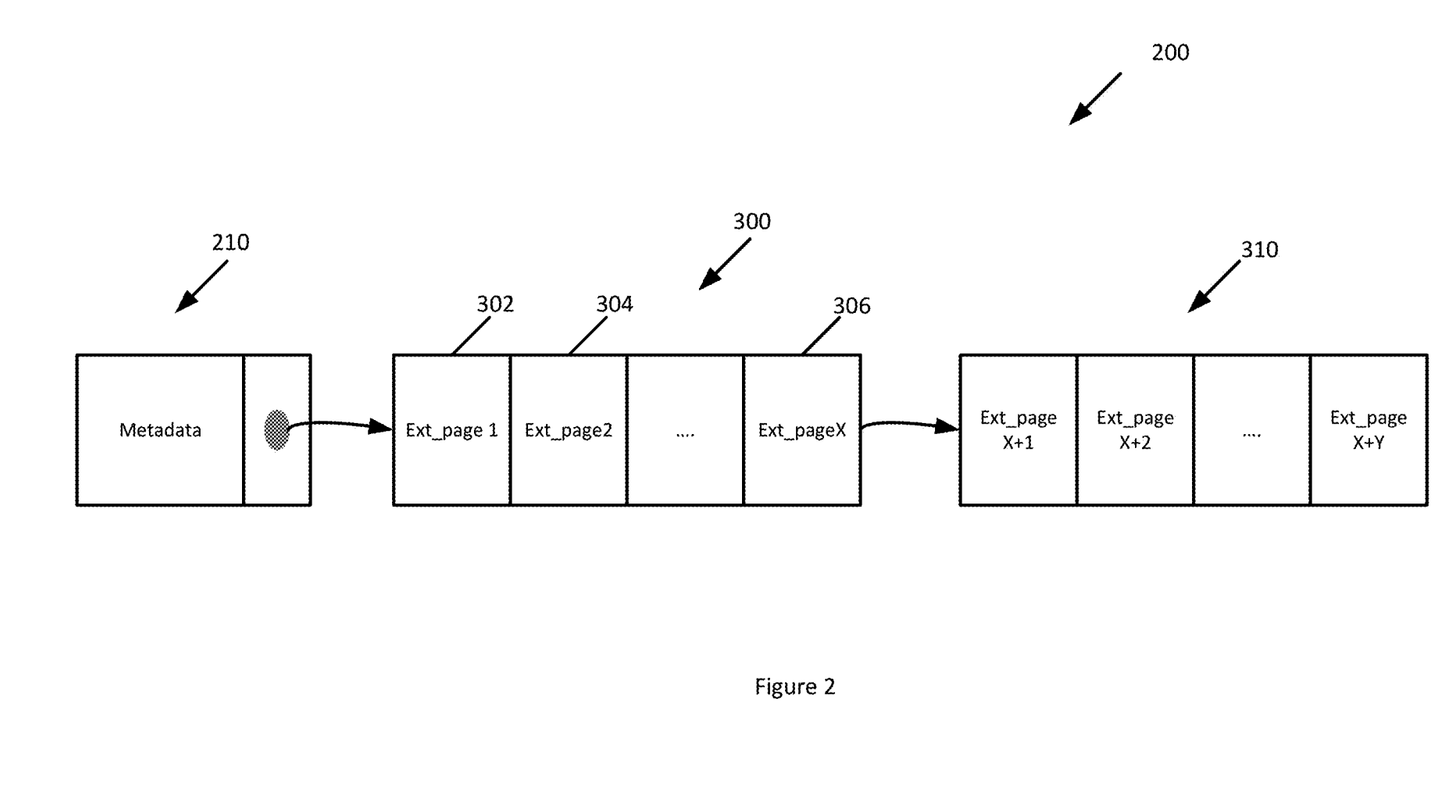
FIG. 2 illustrates a metadata structure, in accordance with various embodiments.

FIG. 2 illustrates a metadata structure, in accordance with various embodiments. As shown in FIG. 2, metadata structure 200 includes volume metadata (VM) 210, ET 300, and ET 310. The metadata for a logical volume may include a wide array of data regarding the logical volume, including, for example, a name and other properties, plus the logical block mapping that indicates a mapping of one or more logical blocks to one or more physical storage blocks, i.e., clusters. ETs 300 and 310 include the mapping, while VM 210 includes the other metadata for the logical volume. As such, VM 210 may point to ET 300, and ET 300 may point to ET 310. In an embodiment, VM 210 provides the metadata, including the mapping, for a thin-provisioned logical volume. In another embodiment, VM 210 provides the metadata, including the mapping, for a logical volume that is not a thin-provisioned logical volume.

ET 300 includes one or more EPs, such as, for example, EPs 302, EP 304, and EP 306. In an embodiment, ET 300 lists the one or more EPs. In another embodiment, ET 300 includes the one or more EPs themselves. ET 300 may list, for example, EP 302. ET 300 further lists an additional EP, such as, for example, EP 304. ET 300 may further list any number of additional EPs up to and including EP 306. In an embodiment, ET 300 lists a number of EPs that is a fixed number of EPs. Accordingly, once the number of EPs listed on ET 300 exceeds a fixed number, metadata structure 200 may include a subsequent ET, for example, ET 310, that lists a number of EPs above the fixed number, and the ET (e.g., ET 300) that reached the fixed number of EPs listed may point to a subsequent ET (e.g., ET 310) that lists a number of EPs above the fixed number of EPs listed on the ET that points to the subsequent ET. Further, if the number of EPs listed on the subsequent ET (e.g., ET 310) exceeds the fixed number, metadata structure 200 may include another subsequent ET that may list a number of EPs above the fixed number of EPs listed on the previous ET that reached the fixed number of EPs, and the ET that reached the fixed number of EPs listed may point to the other subsequent ET.

Metadata structure 200 may include any number of additional subsequent ETs that may list a number of EPs above a fixed number of EPs listed on an ET that points to a subsequent ET. When a number of EPs listed on an ET is a fixed number, an ET may list any number of EPs, up to and including the fixed number. Further, when a number of EPs listed on an ET is a fixed number, an ET may list fewer than a fixed number of EPs even if other ETs list fewer than the fixed number of EPs. In addition, an EP that lists fewer than the fixed number of EPs may point to another ET that lists fewer than the fixed number of EPs.

In another embodiment, an ET may list any number of EPs that is not a fixed number of EPs. If an ET may list any number of EPs that is not a fixed number, an EP may list an unlimited number of EPs, or an ET may list a number of EPs and point to a subsequent EP that includes the same or a different number of EPs, whether a fixed number of EPs or a number of EPs that is not fixed.

Figure 3:
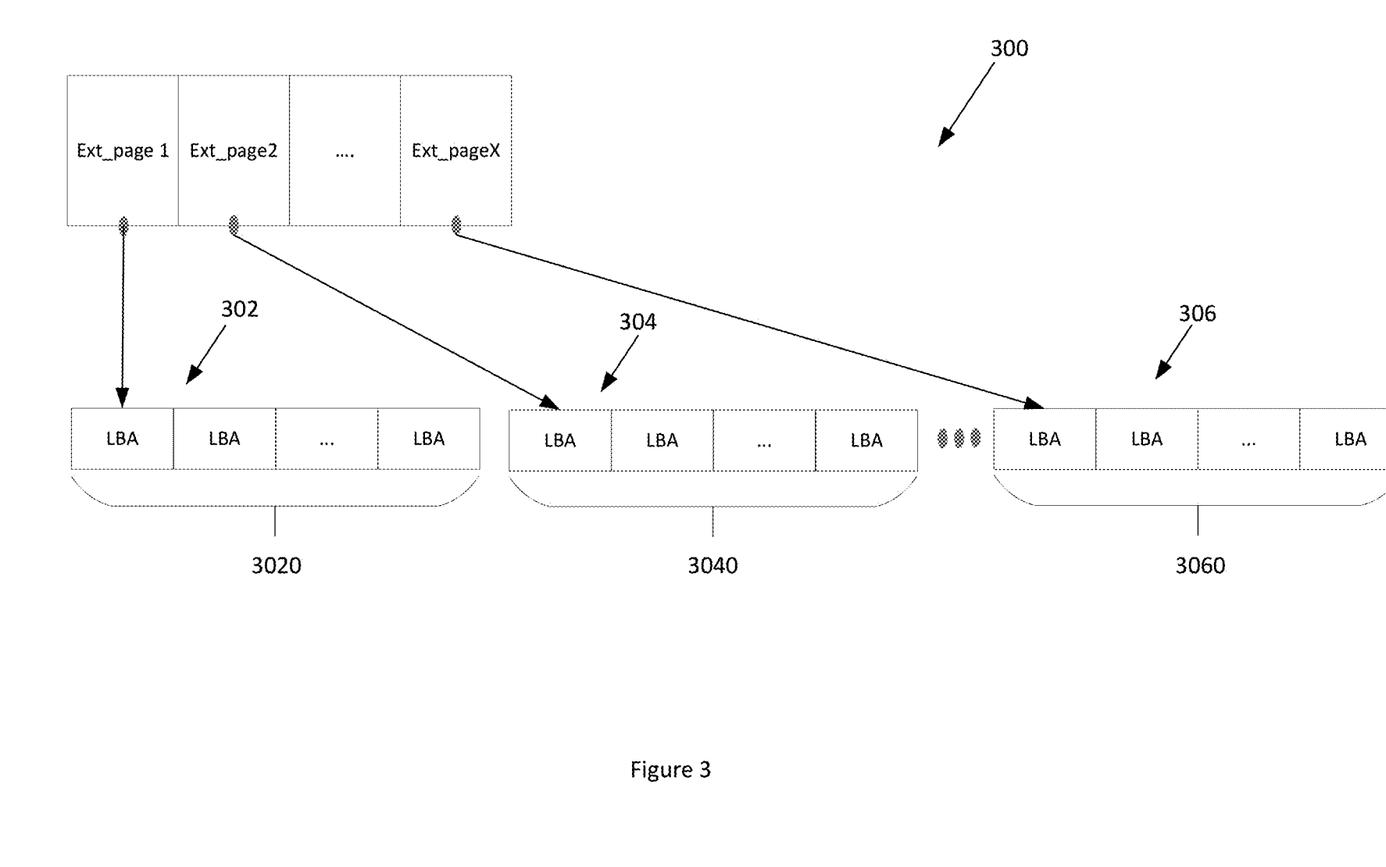
FIG. 3 illustrates a metadata structure of FIG. 2, in accordance with various embodiments.

FIG. 3 illustrates a metadata structure of FIG. 2, in accordance with various embodiments. As shown in FIG. 3, one or more EPs, such as, for example, EPs 302, 304, and 306 of FIG. 2, listed on an ET, such as, for example, ET 300 of FIG. 2, include one or more extents, such as, for example, extents 3020 on EP 302, extents 3040 on EP 304, and extents 3060 on EP 306. In an embodiment, an EP is a fixed size. In an embodiment, the fixed size is based on an atomic write size of a memory device. Thus, for example, ET 300 lists EP 302, and EP 302 is a fixed size that is determined by an atomic write size of memory device 130. In another embodiment, an EP is a size that is not fixed.

An extent corresponds to a cluster of a memory device, where a cluster is mapped to a logical block, which has a range of LBAs, of a logical volume. For example, one of extents 3020 may correspond to cluster 132 of memory device 130, where an extent is mapped to cluster 132. Further, an extent indicates whether a cluster is unallocated or allocated. A cluster that is unallocated has not been reserved for a write to corresponding LBAs of a logical volume, and thus a write to the LBA of the logical volume is not able to be completed. Conversely, if a cluster is allocated, a write to a logical volume's LBA that corresponds to the cluster may be completed.

An extent indicates an allocation of a cluster, or is said to have an allocation indication. In an embodiment, a change in an allocation of a cluster may be from unallocated to allocated, and the allocation indication may be an LBA that corresponds to the cluster. In another embodiment, a change in an allocation of a cluster may be from allocated to unallocated. In an embodiment, an extent may include a number of bits to indicate an allocation. In an embodiment, a number of bits that indicate an allocation may indicate that a cluster is unallocated by, for example, having each bit set to a 0. In an embodiment a number of bits that indicate allocation may indicate that a cluster is allocated by indicating an LBA corresponding to the cluster. In an embodiment, an extent may be a fixed size, such as, for example, but not limited to, a fixed number of bits. In another embodiment, an extent may not be a fixed size.

Figure 4:
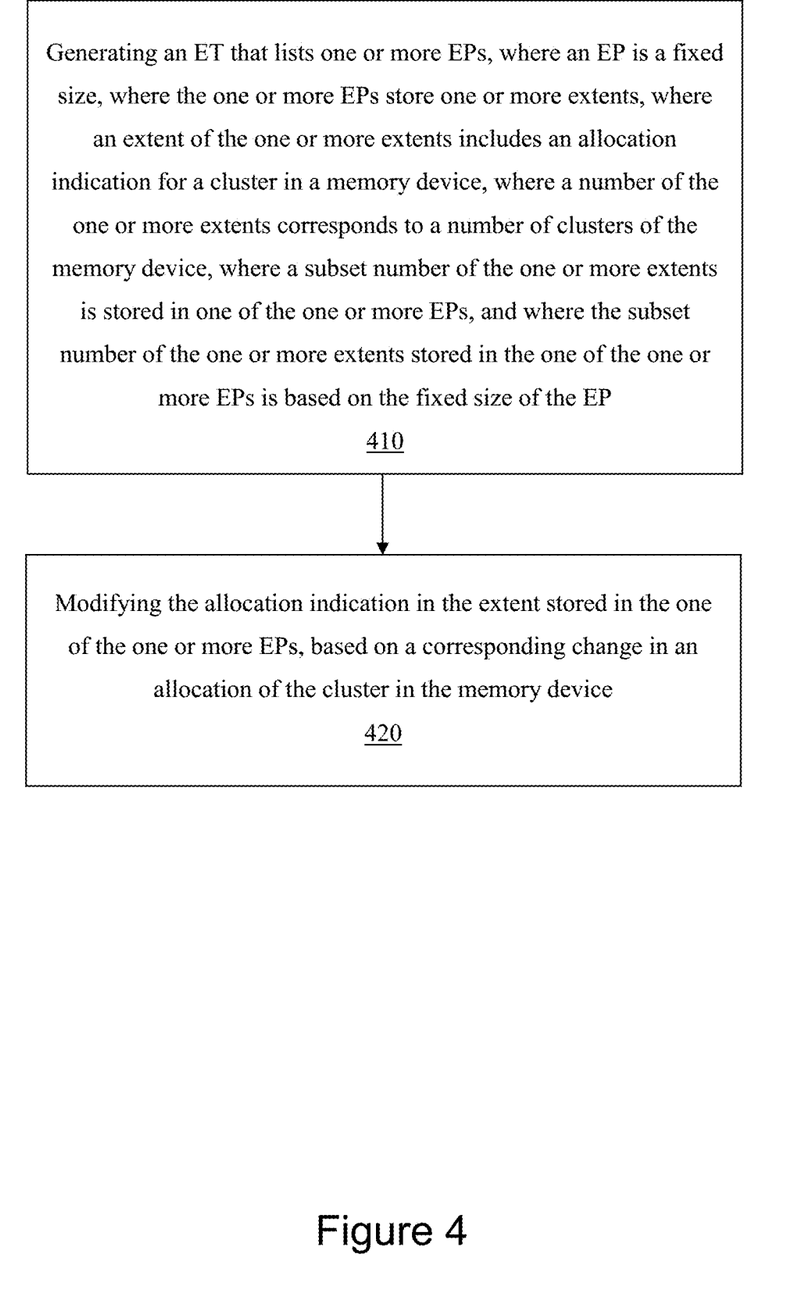
FIG. 4 illustrates an operational flow of a process for generating and updating metadata structures, in accordance with various embodiments.

FIG. 4 illustrates an operational flow of a process for generating and updating a metadata structure, in accordance with various embodiments. In some embodiments, some or all of process 400 may be practiced by components shown and/or described with respect to metadata generator 110 or metadata updater 120 of FIG. 2, or some other component shown or described herein with respect to any other Figure. Process 400 includes blocks 410 through 420. In alternate embodiments, process 400 may have more or fewer operations, and some of the operations may be performed in different order.

At block 410, process 400 includes generating an ET that lists one or more EPs, where an EP is a fixed size. Further, the one or more EPs store one or more extents, where an extent of the one or more extents includes an allocation indication for a cluster in a memory device, where a number of the one or more extents corresponds to a number of clusters of the memory device, where a subset number of the one or more extents is stored in the one or more EPs, and where the subset number of the one or more extents stored in the one or more EPs is based on a the fixed size of the EP.

At block 420, process 400 includes modifying the allocation indication in the extent stored in the one or more EPs, based on a corresponding change in an allocation of the cluster in the memory device. In an embodiment, modifying the allocation indication in the extent stored in the EP, based on a corresponding change in an allocation of the cluster in the memory device includes identifying a change in the allocation of the cluster, and identifying, based on a calculation, an ET that lists or includes an EP that stores or includes an extent mapped to the cluster. The embodiment further includes identifying, based on the calculation, the EP that includes the extent mapped to the cluster, locating, based on the calculation, the extent mapped to the cluster, updating, to indicate the change in the allocation of the cluster, the allocation indication in the extent mapped to the cluster, and writing an updated EP to the memory device, where the updated EP is an EP that includes a modified extent.

In an embodiment, the calculation referred to above includes a first division of a cluster number by a product of a subset number of extents stored in the one or the one or more EPs and a maximum number of EPs listed in an ET, to generate a first whole number and a first whole-number remainder. In an embodiment, the cluster number is an offset expressed in bytes relative to the start of a logical volume. However, embodiments herein are not limited to an offset expressed in bytes and may include, for example, an offset expressed in KB or MB. In an embodiment, an offset is indicated by a LBA. In an embodiment, a first whole-number remainder of zero indicates that the ET is identified by the first whole number, while a first whole-number remainder greater than zero indicates that the ET is identified by one plus the whole number.

In this embodiment, the calculation further includes a second division of the first whole-number remainder by the subset number of extents stored in the one or more EPs, to generate a second whole number and a second whole-number remainder. In an embodiment, a second whole-number remainder of zero may indicate that the extent is a last extent in an EP identified by the second whole number, while a second whole-number remainder greater than zero may indicate that the extent is an extent identified by the second whole-number remainder, in an EP identified by one plus the second whole number.

The calculation may be represented by the following equations:

Cluster Number/(Subset Number of Extents Stored in an EP*Maximum Number of EPs Listed in an ET)=First Whole Number and First Whole-Number Remainder First Whole-Number Remainder/Subset Number of Extents Stored in an EP=Second Whole Number and Second Whole-Number Remainder For example, if a cluster number is 742132, a maximum number of EPs listed on an ET is 500, and a subset number of extents stored in an EP is 500, then to locate the ET, the cluster number at offset 742132 bytes into a logical volume, is divided by the product of the subset number of extents and the maximum number of EPs listed in an ET, i.e., 742132/(500*500), the result is a first whole number of 2 with a first whole-number remainder of 242132. The first whole-number remainder is greater than 0, so one plus the first whole number identifies the ET as ET #3. Further, when the first whole-number remainder, 242132, is divided by the subset number of extents stored in one or more EPs, 500, i.e., 242132/500, the result is a second whole number of 485, and a second whole-number remainder of 132. The second whole-number remainder is greater than 0, so one plus the second whole number identifies the EP as EP #485, which, again, is in ET #3. Finally, the correct extent in EP #485 is given by the second whole-number remainder, i.e., extent #132.

In another embodiment, identifying the ET that lists the EP that stores the extent mapped to the cluster, includes identifying an ET that is within a range of metadata that includes the cluster number. Further, in this embodiment, identifying the EP that includes the extent mapped to the cluster includes identifying an EP that includes a subrange of metadata that includes cluster number, based on the total number of EPs. Further, in this embodiment, locating the extent mapped to the cluster includes locating the extent that is within the subrange identified by the cluster number. For example, if an ET #1 includes mappings for parts of logical volume for OMB to 250 GB, an ET #2 contains 250 GB to 500 GB, etc., where each ET has mappings of 250 GB, then within ET #1, and there are 500 EPs, EP #1 would include OMB to 500 MB, EP #2 would include 500 MB to 1000 MB, etc., up to 250 GB for the 500 EPs. As a result, locating the extent mapped to the cluster for a change in allocation at offset 742132 bytes into a logical volume would include going to ET #3 (which includes metadata in the range between 500 GB and 750 GB), and in ET #3, going to EP 485 (which includes the subrange between 742 GB and 742.5 GB), and finally extent 132 (742132 MB), to find the mapping to the correct cluster.

Figure 5A:
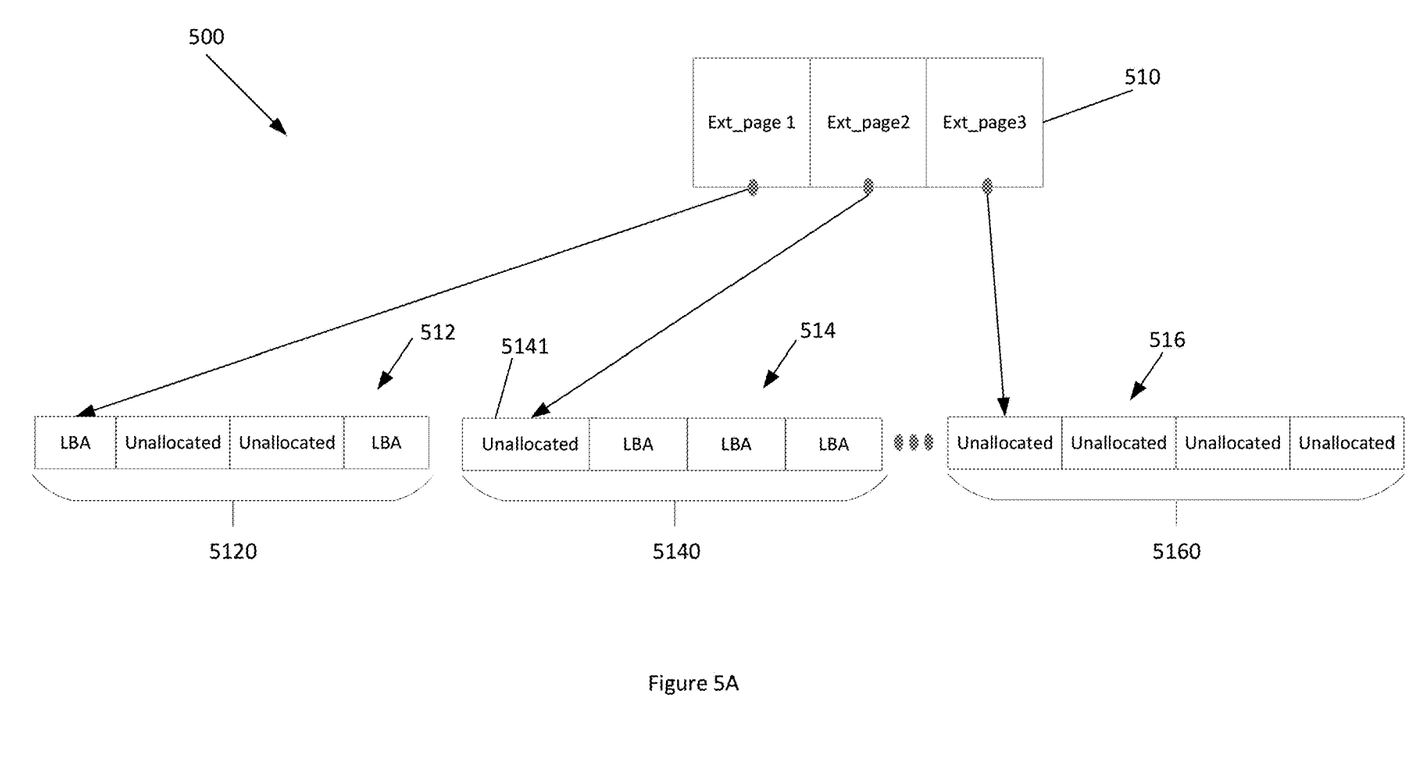
FIGS. 5A and 5B illustrate updated metadata structures, in accordance with various embodiments.
Figure 5B:
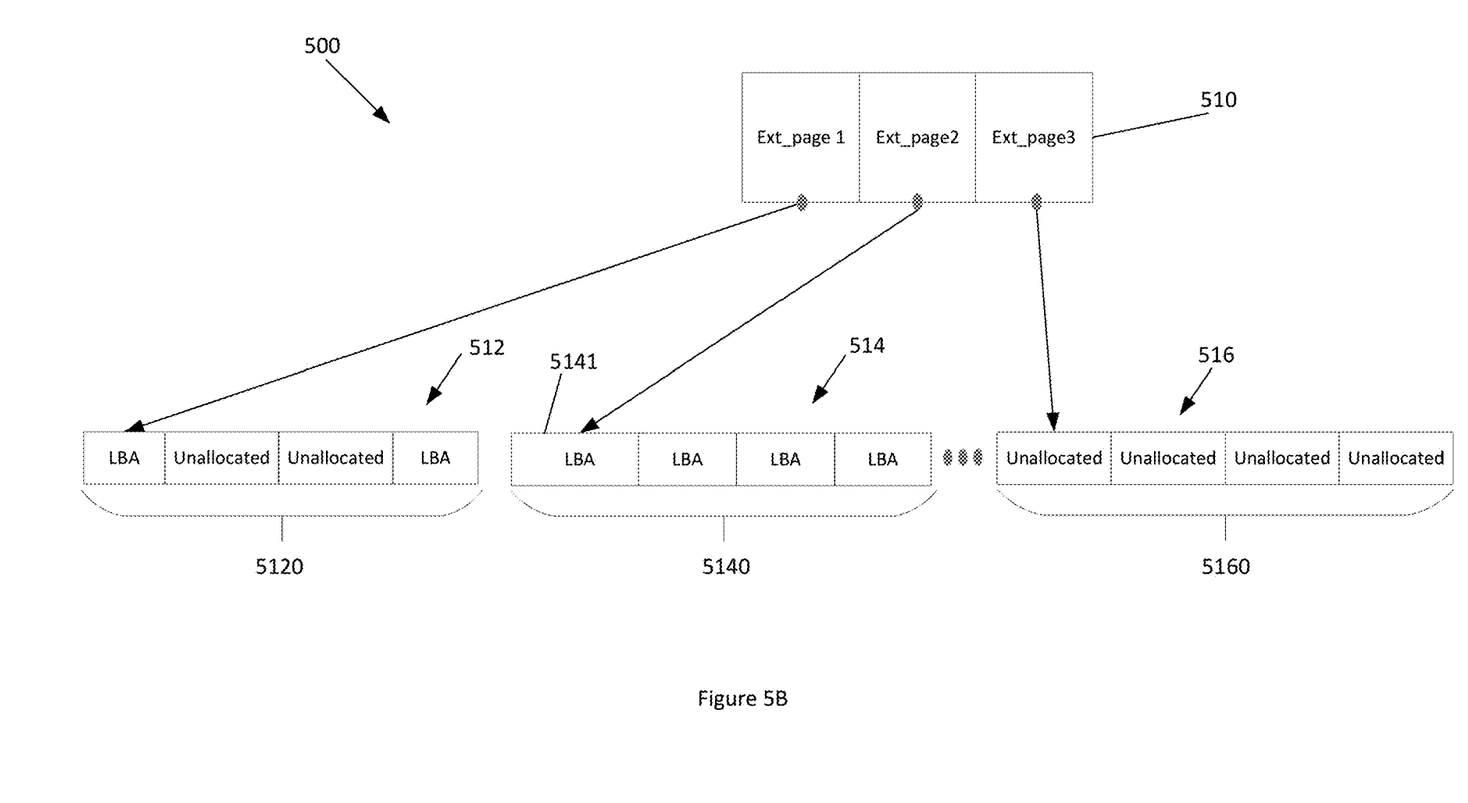

FIGS. 5A and 5B illustrate an updated metadata structure, in accordance with various embodiments. As shown in FIG. 5A, extents metadata structure 500 may include ET 510 that lists EPs 512, 514, and 516. EP 514 may include a number of extents 5140 that includes extent 5141. Extent 5141 may indicate that a cluster mapped to extent 5141 is unallocated. As shown in FIG. 5B, extent 5141 has been updated to indicate that the cluster mapped to extent 5141 has gone from being unallocated to being allocated, as indicated by extent 5141 indicating a logical volume's LBA that corresponds to the cluster that went from being unallocated to being allocated.

Thus, because of the fixed length of EPs, the exact extent to be updated on a logical block mapping change can be selected from an ET using a calculation, as described above. When updating an extent, it is only necessary to write a single EP to a memory device, which may also be referred to as a disk. This allows for atomic updates on NVMe devices, which may guarantee atomic updates for, for example, 4 KiB writes. Consequently, embodiments herein include aspects to reduce the number of writes required during a metadata update when the mapping of logical blocks to clusters is modified.

Accordingly, embodiments herein include aspects to define a fixed-length metadata structure that may be stored on-disk and that may be partially updated through the updating of extents, while still maintaining atomicity guarantees. Among other benefits, this may decrease the amount or number of disk accesses and thereby improve performance. Further, as noted above, by having an on-disk mapping between physical blocks and logical blocks of a storage volume be a fixed length, a calculation, or an algorithm or math, can be used to determine the location of the portion of metadata that needs to be updated. Among other benefits, this may limit the number of required writes to a disk, as the rest of the metadata is left unmodified. In addition, embodiments herein allow for faster performing thin-provisioned storage volumes, which may increase the value of, for example, each GB of NVMe SSDs. Enabling thin-provisioned volumes with near native performance may provide significant cost reduction and flexibility of hardware setup. Finally, when updating multiple mappings, instead of queuing any further changes until after all metadata is written to the disk, embodiments herein include aspects to enable extents to be updated independently of each other and thus have queuing only for changes within the same extent.

Figure 6:
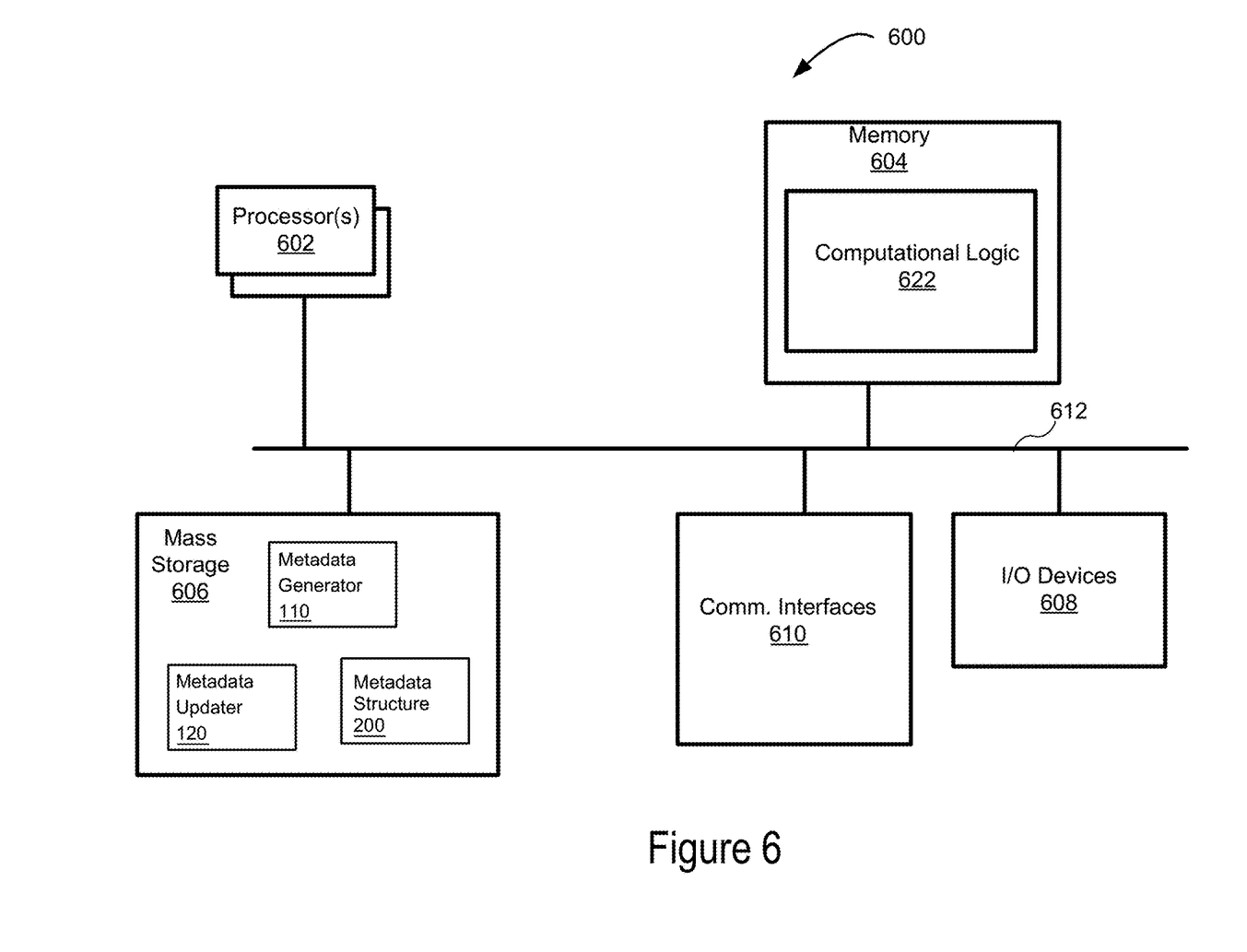
FIG. 6 illustrates an example computing device suitable to practice aspects of the present disclosure, in accordance with various embodiments.

FIG. 6 illustrates a block diagram of an example computing device 600 that may be suitable for use with metadata generator 110, metadata updater 120, and memory device 130 of FIG. 1, the metadata structure 200 illustrated in FIG. 2, the metadata structure 300 illustrated in FIG. 3, the updated metadata structure illustrated in FIGS. 5A and 5B, and/or the process 400 of FIG. 4, in accordance with various embodiments.

As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. In some embodiments, processors 602, in addition to cores, may further include hardware accelerators, e.g., hardware accelerators implemented with Field Programmable Gate Arrays (FPGA). The computing device 600 may include mass storage devices 606 (such as diskette, hard drive, non-volatile memory (NVM) (e.g., compact disc read-only memory (CD-ROM), digital versatile disk (DVD), any other type of suitable NVM, and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 600 may further include I/O devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth), one or more antennas, and/or any other suitable component.

The communication interfaces 610 may include communication chips (not shown for clarity) that may be configured to operate the computing device 600 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600, one or more applications, operations associated with computing device 600, operations associated with the processor 602, and/or operations associated with the mass storage device 606, collectively denoted as computational logic 622. The various elements may be implemented by assembler instructions supported by processor(s) 602 or high-level languages that may be compiled into such instructions. In some embodiments, processor 602 may be implemented as a fixed function ASIC, a FPGA, or any other suitable device with or without programmability or configuration options.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 602 may be packaged together with computational logic 622 configured to practice aspects of embodiments described herein to form a System in Package (SiP) or a System on Chip (SoC).

In various implementations, the computing device 600 may comprise one or more components of a data center, a laptop, a netbook, a notebook, an ultrabook, a smartphone, a tablet, an ultra-mobile PC, or a mobile phone. In some embodiments, the computing device 600 may include one or more components of a server. In further implementations, the computing device 600 may be any other electronic device that processes data.

Figure 7:
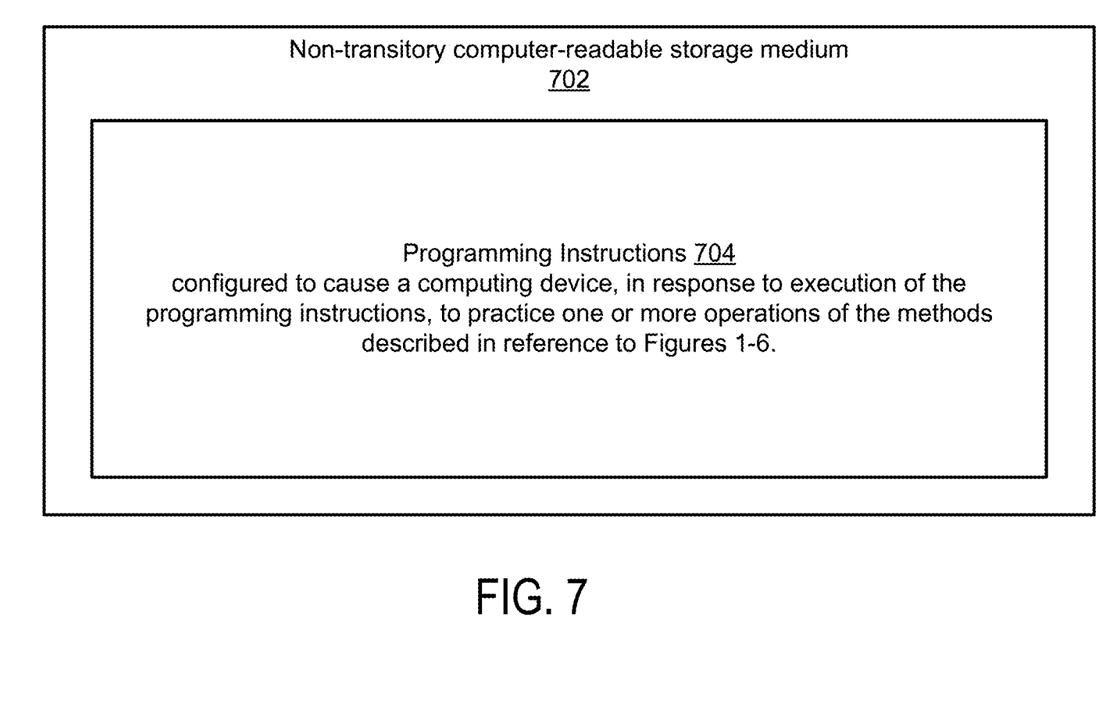
FIG. 7 illustrates an example storage medium with instructions configured to practice aspects of the present disclosure, in accordance with various embodiments.

FIG. 7 illustrates an example computer-readable non-transitory storage medium 702 having instructions configured to practice all or selected ones of the operations associated with the computing device 600, earlier described with respect to FIG. 6; metadata generator 110, metadata updater 120, and/or memory device 130 described with respect to FIG. 1; one or more metadata structures 200 described with respect to FIG. 2; one or more metadata structures 300 described with respect to FIG. 3; one or more updated metadata structures 500 described with respect to FIG. 5; and/or process 400 described with respect to FIG. 4, in accordance with various embodiments.

As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., part or all of the computing device of FIG. 1, in response to execution of the programming instructions 704, to perform, e.g., but not limited to, various operations described for the metadata generator 110, metadata updater 120, and/or memory device 130 of FIG. 1; one or more metadata structures 200 of FIG. 2; one or more metadata structures 300 of FIG. 3; one or more updated metadata structures 500 of FIG. 5; and/or process 400 of FIG. 4. In alternate embodiments, programming instructions 704 may be disposed on multiple computer-readable storage media 702. In an alternate embodiment, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects shown or described for part or all of metadata generator 110, metadata updater 120, and/or memory device 130 of FIG. 1; and/or the metadata generating and updating process 400 of FIG. 4. For an embodiment, at least one of processors 602 may be packaged together with memory having all or portions of computational logic 622 configured to practice aspects described for part or all of metadata generator 110, metadata updater 120, and/or memory device 130 of FIG. 1; and/or the metadata generating and updating process 400 of FIG. 4 to form a System in Package (SiP). For an embodiment, at least one of processors 602 may be integrated on the same die with memory having all or portions of computational logic 622 configured to practice aspects described for part or all of metadata generator 110, metadata updater 120, and/or memory device 130 of FIG. 1; and/or the metadata generating and updating process 400 of FIG. 4. For an embodiment, at least one of processors 602 may be packaged together with memory having all or portions of computational logic 622 configured to practice aspects of part or all of metadata generator 110, metadata updater 120, and/or memory device 130 of FIG. 1; and/or the metadata generating and updating process 400 of FIG. 4 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Various components described herein may be a means for performing the operations or functions described. Each component described herein may include software, hardware, or a combination of these. The components may be implemented as software modules, hardware modules, special-purpose hardware (e.g., application specific hardware, application specific integrated circuits (ASICs), digital signal processors (DSPs), etc.), embedded controllers, hardwired circuitry, and/or any other suitable hardware or software component. Besides what is described herein, various modifications may be made to the disclosed embodiments and implementations without departing from their scope.

Illustrative non-limiting examples of the technologies disclosed herein are provided below. An embodiment of the technologies may include any one or more, and any combination of, the examples described below.

EXAMPLES

According to various embodiments, the present disclosure describes a number of examples.

Example 1 includes an electronic apparatus, comprising: a metadata generator, to generate an extents table (ET) that lists one or more extents pages (EPs), wherein an EP is a fixed size, wherein the one or more EPs store one or more extents, wherein an extent of the one or more extents includes an allocation indication for a cluster in a memory device associated with the electronic apparatus, wherein a number of the one or more extents corresponds to a number of clusters of the memory device, wherein a subset number of the one or more extents is stored in one of the one or more EPs, and wherein the subset number of the one or more extents stored in the one of the one or more EPs is based on the fixed size of the EP; and a metadata updater coupled with the metadata generator, to modify the allocation indication in the extent stored in the one of the one or more EPs, based on a corresponding change in an allocation of the cluster in the memory device.

Example 2 includes the electronic apparatus of Example 1 or some other example herein, wherein the fixed size of the EP is based on an atomic write size of the memory device, and wherein the subset number of the one or more extents stored in the one or more EPs is based on the fixed size of the EP and a size of an extent.

Example 3 includes the electronic apparatus of Example 1 or 2 or some other example herein, wherein the memory device is a solid state drive that includes a thin-provisioned logical volume.

Example 4 includes the electronic apparatus of Example 1 or 2 or some other example herein, wherein the number of clusters of the memory device is based on a size of the logical volume and a size of the cluster.

Example 5 includes the electronic apparatus of Example 1 or 2 or some other example herein, wherein the metadata generator is further to write the ETs and EPs to the memory device.

Example 6 includes the electronic apparatus of Example 1 or 2 or some other example herein, wherein the corresponding change in the allocation of the cluster is from unallocated to allocated, and wherein the allocation indication is a logical block address (LBA) that corresponds to the cluster.

Example 7 includes the apparatus of Example 1 or 2 or some other example herein, wherein to modify the allocation indication in the extent stored in the one of the one or more EPs, based on the corresponding change in the allocation of the cluster in the memory device, the metadata updater is to: identify a change in the allocation of the cluster; identify, based on a calculation, an ET that includes an EP that includes an extent mapped to the cluster; identify, based on the calculation, the EP that includes the extent mapped to the cluster; locate, based on the calculation, the extent mapped to the cluster; update, to indicate the change in the allocation of the cluster, the allocation indication in the extent mapped to the cluster; and write an updated EP to the memory device, wherein the updated EP is the EP that includes a modified extent.

Example 8 includes the electronic apparatus of Example 7 or some other example herein, wherein the calculation includes: a first division of a cluster number by a product of a subset number of extents stored in the one or the one or more EPs and a maximum number of EPs listed in an ET, to generate a first whole number and a first whole-number remainder, wherein a 0 for the first whole-number remainder is to indicate that the ET is identified by the first whole number, and wherein a greater-than-0 first whole-number remainder indicates that the ET is identified by a one plus the whole number; and a second division of the first whole-number remainder by the subset number of extents stored in the one or more EPs, to generate a second whole number and a second whole-number remainder, wherein a 0 second whole-number remainder is to indicate that the extent is a last extent in an EP identified by the second whole number, and wherein a greater-than-0 second whole-number remainder is to indicate that the extent is an extent identified by the second whole-number remainder, in an EP identified by the one plus the second whole number.

Example 9 includes the electronic apparatus of Example 1 or 2 or some other example herein, further comprising a processor, wherein the metadata generator and metadata updater are executable on the processor, to generate the ET and modify the allocation indication in an extent stored in the one of the one or more extent pages.

Example 10 includes the electronic apparatus of Example 9 or some other example herein, wherein the metadata generator and metadata updater comprise a memory storage driver.

Example 11 includes the electronic apparatus of Example 10 or some other example herein, wherein the electronic apparatus comprises a computing device.

Example 12 includes one or more non-transitory computer-readable media having instructions for generating metadata stored thereon that, when executed on a processor, cause the processor to: generate an extents table (ET) that lists one or more extents pages (EPs), wherein an EP is a fixed size, wherein the one or more EPs store one or more extents, wherein an extent of the one or more extents includes an allocation indication for a cluster in a memory device, wherein a number of the one or more extents corresponds to a number of clusters of the memory device, wherein a subset number of the one or more extents is stored in one of the one or more EPs, and wherein the subset number of the one or more extents stored in the one of the one or more EPs is based on the fixed size of the EP; and modify the allocation indication in the extent stored in the one of the one or more EPs, based on a corresponding change in an allocation of the cluster in the memory device.

Example 13 includes the one or more non-transitory, computer-readable media of Example 12, wherein the fixed size of the EP is based on an atomic write size of the memory device, and wherein the subset number of the one or more extents stored in the one or more EPs is based on the fixed size of the EP and a size of an extent.

Example 14 includes the one or more non-transitory, computer-readable media of Example 12 or 13, wherein the memory device is a solid state drive that includes a thin-provisioned logical volume.

Example 15 includes the one or more non-transitory, computer-readable media of Example 12 or 13, wherein the instructions, when executed, further cause the processor to write the ETs and EPs to the memory device.

Example 16 includes the one or more non-transitory, computer-readable media of Example 12 or 13, wherein the corresponding change in the allocation of the cluster is from unallocated to allocated, and wherein the allocation indication is a logical block address (LBA) that corresponds to the cluster.

Example 17 includes the one or more non-transitory, computer-readable media of Example 12 or 13, wherein to modify the allocation indication in the extent stored in the one of the one or more EPs, based on the corresponding change in the allocation of the cluster in the memory device, the metadata updater is to: identify a change in the allocation of the cluster; identify, based on a calculation, an ET that includes an EP that includes an extent mapped to the cluster; identify, based on the calculation, the EP that includes the extent mapped to the cluster; locate, based on the calculation, the extent mapped to the cluster; update, to indicate the change in the allocation of the cluster, the allocation indication in the extent mapped to the cluster; and write an updated EP to the memory device, wherein the updated EP is the EP that includes a modified extent, wherein the calculation includes: a first division of a cluster number by a product of a subset number of extents stored in the one or the one or more EPs and a maximum number of EPs listed in an ET, to generate a first whole number and a first whole-number remainder, wherein a 0 for the first whole-number remainder is to indicate that the ET is identified by the first whole number, and wherein a greater-than-0 first whole-number remainder indicates that the ET is identified by a one plus the whole number; and a second division of the first whole-number remainder by the subset number of extents stored in the one or more EPs, to generate a second whole number and a second whole-number remainder, wherein a 0 second whole-number remainder is to indicate that the extent is a last extent in an EP identified by the second whole number, and wherein a greater-than-0 second whole-number remainder is to indicate that the extent is an extent identified by the second whole-number remainder, in an EP identified by the one plus the second whole number.

Example 18 includes a computer system, comprising: a memory device; and a processor coupled with the memory device, to: generate an extents table (ET) that lists one or more extents pages (EPs), wherein an EP is a fixed size, wherein the one or more EPs store one or more extents, wherein an extent of the one or more extents includes an allocation indication for a cluster in a memory device, wherein a number of the one or more extents corresponds to a number of clusters of the memory device, wherein a subset number of the one or more extents is stored in one of the one or more EPs, and wherein the subset number of the one or more extents stored in the one of the one or more EPs is based on the fixed size of the EP; and modify the allocation indication in the extent stored in the one of the one or more EPs, based on a corresponding change in an allocation of the cluster in the memory device.

Example 19 includes the computer system of Example 18 or some other example herein, wherein the fixed size of the EP is based on an atomic write size of the memory device, wherein the number of extents stored in the one or more EPs is based on the fixed size of the EP and a size of an extent, and wherein the ET is the fixed size.

Example 20 includes the computer system of Example 18 or 19 or some other example herein, wherein to modify the allocation indication in the extent stored in the one of the one or more EPs, based on the corresponding change in the allocation of the cluster in the memory device, the metadata updater is to: identify a change in the allocation of the cluster; identify, based on a calculation, an ET that includes an EP that includes an extent mapped to the cluster; identify, based on the calculation, the EP that includes the extent mapped to the cluster; locate, based on the calculation, the extent mapped to the cluster; update, to indicate the change in the allocation of the cluster, the allocation indication in the extent mapped to the cluster; and write an updated EP to the memory device, wherein the updated EP is the EP that includes a modified extent, wherein the calculation includes: a first division of a cluster number by a product of a subset number of extents stored in the one or the one or more EPs and a maximum number of EPs listed in an ET, to generate a first whole number and a first whole-number remainder, wherein a 0 for the first whole-number remainder is to indicate that the ET is identified by the first whole number, and wherein a greater-than-0 first whole-number remainder indicates that the ET is identified by a one plus the whole number; and a second division of the first whole-number remainder by the subset number of extents stored in the one or more EPs, to generate a second whole number and a second whole-number remainder, wherein a 0 second whole-number remainder is to indicate that the extent is a last extent in an EP identified by the second whole number, and wherein a greater-than-0 second whole-number remainder is to indicate that the extent is an extent identified by the second whole-number remainder, in an EP identified by the one plus the second whole number.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions stored thereon that, when executed, result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An electronic apparatus, comprising:
a memory device;
a processor coupled with the memory device; and
logic executable on the processor to operate the memory device, wherein the logic includes:
  a metadata generator, to generate at least first and second extents tables (ETs) that comprise a list of one or more extents pages (EPs), wherein when a number of EPs to be listed in the first or second ETs is a fixed number, an actual number of EPs listed in the first ET exceeds the fixed number, the second ET lists an excess number of EPs that is above the fixed number of EPs to be listed in the first ET, wherein each of the one or more EPs is to store one or more extents, wherein each EP of the one or more EPs is a fixed size, wherein an extent of the one or more extents includes an allocation indication for a cluster in the memory device, wherein the extent has a fixed size that comprises a fixed number of bits, wherein the cluster is mapped to a logical block with a range of logical block addresses (LBA), wherein the number of bits that indicate the allocation further indicate that the cluster is allocated by indicating an LBA corresponding to the cluster, wherein a number of the one or more extents corresponds to a number of clusters of the memory device, wherein a subset number of the one or more extents is stored in one of the one or more EPs, and wherein the subset number of the one or more extents stored in the one of the one or more EPs is based on the fixed number of the EPs; and
  a metadata updater coupled with the metadata generator, to modify the allocation indication in the extent stored in the one of the one or more EPs, based on a corresponding change in an allocation of the cluster in the memory device, wherein to modify the allocation indication includes to select the extent to be updated from the ET based on a calculation, and write a single EP containing the selected extent to the memory device,
wherein the calculation includes:
  a first division of a cluster number by a product of a subset number of extents stored in the one or the one or more EPs and a maximum number of EPs listed in the first or second ET, to generate a first whole number and a first whole-number remainder; and
  a second division of the first whole-number remainder by the subset number of extents stored in the one or more EPs, to generate a second whole number and a second whole-number remainder,
wherein the second whole-number remainder of zero indicates that the extent is a last extent in an EP identified by the second whole number, and wherein the second whole-number remainder greater than zero indicates that the extent is an extent identified by the second whole-number remainder, in an EP identified by one plus the second whole number.

2. The electronic apparatus of claim 1, wherein the fixed size of the EP is based on an atomic write size of the memory device, and wherein the subset number of the one or more extents stored in the one or more EPs is based on the fixed size of the EP and the size of the extent.

3. The electronic apparatus of claim 1, wherein the memory device is a solid state drive that includes a thin-provisioned logical volume.

4. The electronic apparatus of claim 1, wherein the number of clusters of the memory device is based on a size of the logical volume and a size of the cluster.

5. The electronic apparatus of claim 1, wherein the metadata generator is further to write the first and second ETs and EPs to the memory device.

6. The electronic apparatus of claim 1, wherein to modify the allocation indication in the extent stored in the one of the one or more EPs, based on the corresponding change in the allocation of the cluster in the memory device, the metadata updater is to:
identify a change in the allocation of the cluster;
identify, based on the calculation, the first or second ET that includes an EP that includes an extent mapped to the cluster;
identify, based on the calculation, the EP that includes the extent mapped to the cluster;
locate, based on the calculation, the extent mapped to the cluster;
update, to indicate the change in the allocation of the cluster, the allocation indication in the extent mapped to the cluster; and
write an updated EP to the memory device, wherein the updated EP is the single EP that includes a modified extent.

7. The electronic apparatus of claim 1, further comprising a processor, wherein the metadata generator and metadata updater are executable on the processor, to generate the ET and modify the allocation indication in the extent stored in the one of the one or more extent pages.

8. The electronic apparatus of claim 7, wherein the metadata generator and metadata updater comprise a memory storage driver.

9. The electronic apparatus of claim 8, wherein the electronic apparatus comprises a computing device.

10. One or more non-transitory computer-readable media having instructions for generating metadata stored thereon that, when executed on a processor, cause the processor to:
generate at least first and second extents tables (ETs) that comprise a list of one or more extents pages (EPs), wherein when a number of EPs to be listed in the first or second ETs is a fixed number, an actual number of EPs listed in the first ET exceeds the fixed number, the second ET lists an excess number of EPs that is above the fixed number of EPs to be listed in the first ET, wherein each of the one or more EPs is to store one or more extents, wherein each EP of the one or more EPs is a fixed size, wherein an extent of the one or more extents includes an allocation indication for a cluster in a memory device coupled with the processor, wherein the extent has a fixed size that comprises a fixed number of bits, wherein the cluster is mapped to a logical block with a range of logical block addresses (LBA), wherein the number of bits that indicate the allocation further indicate that the cluster is allocated by indicating an LBA corresponding to the cluster, wherein a number of the one or more extents corresponds to a number of clusters of the memory device, wherein a subset number of the one or more extents is stored in one of the one or more EPs, and wherein the subset number of the one or more extents stored in the one of the one or more EPs is based on the fixed number of the EPs; and
modify the allocation indication in the extent stored in the one of the one or more EPs, based on a corresponding change in an allocation of the cluster in the memory device, wherein to modify the allocation indication includes to select the extent to be updated from the ET based on a calculation, and write a single EP containing the selected extent to the memory device,
wherein the calculation includes:
a first division of a cluster number by a product of a subset number of extents stored in the one or the one or more EPs and a maximum number of EPs listed in an ET, to generate a first whole number and a first whole-number remainder; and
a second division of the first whole-number remainder by the subset number of extents stored in the one or more EPs, to generate a second whole number and a second whole-number remainder,
wherein the second whole-number remainder of zero indicates that the extent is a last extent in an EP identified by the second whole number, and wherein the second whole-number remainder greater than zero indicates that the extent is an extent identified by the second whole-number remainder, in an EP identified by one plus the second whole number.

11. The one or more non-transitory, computer-readable media of claim 10, wherein the fixed size of the EP is based on an atomic write size of the memory device, and wherein the subset number of the one or more extents stored in the one or more EPs is based on the fixed size of the EP and the size of the extent.

12. The one or more non-transitory, computer-readable media of claim 10, wherein the memory device is a solid state drive that includes a thin-provisioned logical volume.

13. The one or more non-transitory, computer-readable media of claim 10, wherein the instructions, when executed, further cause the processor to write the ETs and EPs to the memory device.

14. The one or more non-transitory, computer-readable media of claim 10, wherein to modify the allocation indication in the extent stored in the one of the one or more EPs, based on the corresponding change in the allocation of the cluster in the memory device, the instructions further cause the processor to:
identify a change in the allocation of the cluster;
identify, based on the calculation, the first or second ET that includes an EP that includes an extent mapped to the cluster;
identify, based on the calculation, the EP that includes the extent mapped to the cluster;
locate, based on the calculation, the extent mapped to the cluster;
update, to indicate the change in the allocation of the cluster, the allocation indication in the extent mapped to the cluster; and
write an updated EP to the memory device, wherein the updated EP is the single EP that includes a modified extent.

* * * * *